UNITED STATES PATENT OFFICE 2,195,885

STIBONYL DIARYL THIOCARBAMIDO COMPOUNDS AND PROCESS FOR MAKING THEM

George Malcolm Dyson, Loughborough, and Arnold Renshaw, Manchester, England, assignors to Parke, Davis & Company, Detroit, Mich., a corporation of Michigan No Drawing. Application July 31, 1935, Serial No. 34,109. In Great Britain June 17, 1935

9 Claims. (Cl. 260—446)

The invention relates to new aryl stibonic acid compounds and methods for making the same, especially to such compounds in which there is directly attached to the aryl nucleus a thiocarbimido group (—N=C=S) or a thiocarbamido group

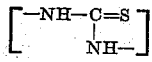

It is an object of the invention to prepare thiocarbimido and thiocarbamido substituted aryl stibonic acid compounds which can readily be obtained in the form of their aqueous solutions, many of which possess a hydrogen ion concentration about that of normal blood pH. It is a further object to obtain said compounds in a degree of purity which will enable them to be used as intermediates for the preparation of other new and useful compounds or of such purity that they may be directly used in the form of their sterile solutions for injection for therapeutic and like uses.

Another object of the invention is to provide a method whereby the new aryl stibonic acids of this invention may be produced at relatively low cost and by comparatively simple procedures.

The above objects, and other objects which will be apparent from the detailed description of the invention given below, may be attained by reacting an aryl stibonic acid substituted in the aryl nucleus by one or more amino groups with a thiocarbonyl halide, such as thiocarbonyl chloride, to obtain the corresponding thiocarbimido derivative of the aryl stibonic acid, or by reacting such an amino substituted aryl stibonic acid with an aryl mono- or poly-thiocarbimide. The amino substituted aryl stibonic acid compound is used preferably in freshly prepared state or in the form of its alkali metal salt. The aryl thiocarbimide may carry a salt-forming substituent group, such as a sulfonic acid group, arsonic acid group, stibonic acid group, carboxyl radical or hydroxyl radical. The final compounds of the invention may be prepared as the free acids or as their salts with basic substances, such as alkali or alkaline earth metal compounds or ammonia, urea, aliphatic amines, amino alcohols or the like, and especially with those basic substances giving a soluble salt. In general, the salts are more soluble than their corresponding free acids and are more suitable for injection.

Although the broad features of the invention embody production of both thiocarbimide and thiocarbamide compounds, the preferred compounds are stibonyl diaryl thiocarbamide compounds of the formula

where R is an aryl radical, (such as phenyl, naphthyl, or anthracenyl), carrying a stibonic acid group (—SbO₃H₂) or its equivalent salt group attached to the aryl nucleus, and R' is likewise such an aryl radical carrying a salt-forming group such as the sulfonic, arsonic, or stibonic acid groups, carboxyl or hydroxyl. These preferred compounds also include compounds in which other substituents are present in the aryl nucleus. For example, in the compound 3,5-bis-(4'-stibonyl phenyl thiocarbamido-1-) benzoic acid having the formula,

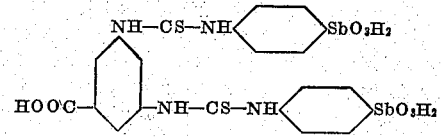

the aryl radical carrying the salt-forming carboxyl group is also substituted by the radical

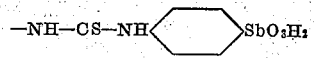

The invention will be more readily understood by the following examples which are given merely by way of illustration.

EXAMPLE 1.—*4-thiocarbimido phenyl stibonic acid*

5 grams of para amino phenyl stibonic acid is stirred with 800 cc. of 2 N hydrochloric acid. The resulting solution is filtered from a very small amount of insoluble material and then placed in a stoppered container with 7 grams of thiocarbonyl chloride and the mixture shaken thoroughly. After a few minutes shaking, an almost colorless precipitate begins to form. The mixture is shaken for another hour and then filtered. The residue on the filter is practically colorless. It is washed with water, transferred to a vacuum desiccator and thoroughly dried to give an almost white powder. Anaylsis for antimony shows approximately 38%, whereas the theoretical for 4-thiocarbimido phenyl stibonic acid, C₇H₆O₃NSSB, requires a little over 39% antimony. The stibonic acid is converted to its sodium derivative by solution in the minimum quantity of 2 N sodium hydroxide solution. This solution is then poured into alcohol and after an hour the precipitated sodium salt is filtered off and dried in vacuo to give a powder which is completely soluble in cold water.

The essential reactions of this example may be represented in the following equation:

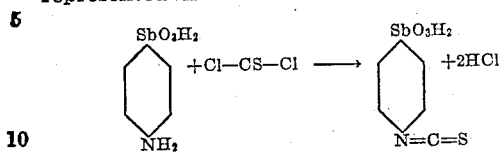

By starting with an amino phenyl stibonic acid isomeric with the para compound used in Example 1 above, such as meta amino phenyl stibonic acid, compounds isomeric with the 4-thiocarbimido phenyl stibonic acid of this example are obtained in which the thiocarbimido group occupies correspondingly different positions in the aryl nucleus. For example, 3-thiocarbimido stibonic acid is obtained by starting with meta amino phenyl stibonic acid. Moreover, instead of starting with a mono amino phenyl stibonic acid, poly amino compounds, such as 3,5-diamino phenyl stibonic acid, may be used to obtain dithiocarbimido derivatives of phenyl stibonic acids.

EXAMPLE 2.—*3,5-bis-(4'-stibonyl phenyl thiocarbamido-1-) benzoic acid*

Para amino phenyl stibonic acid is suspended in water and a concentrated solution of potassium hydroxide added until the well-stirred mixture becomes almost clear. A second solution is prepared by suspending in water an amount of 3,5-dithiocarbimido benzoic acid chemically equivalent to the quantity of para amino phenyl stibonic acid used in making the first solution, and then dissolving the suspension by adding the minimum of sodium hydroxide solution. This second solution is then added to the first solution of para amino phenyl stibonic acid and the mixed solutions are rapidly heated to 80° C. while being mechanically stirred. After 15 or 20 minutes at about 80° C. the solution is rapidly cooled and enough dilute hydrochloric acid added to make the resultant mixture strongly acid to paper impregnated with Congo red. The precipitated acid is then filtered off, washed with water and hot alcohol and then dried to give the solid, 3,5-bis-(4'-stibonyl phenyl thiocarbamido-1-) benzoic acid. The main reaction in this example can be illustrated in its essentials by the following equation:

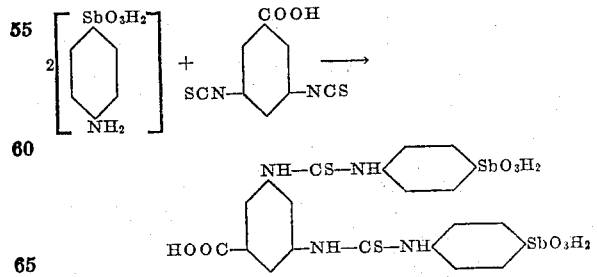

The urea salt of the acid of this example is prepared by suspending the acid in water and while mechanically stirring adding solid urea and warming the mixture to 45° C. to facilitate solution. The solution is then filtered from a slight amount of insoluble matter and poured into a large excess of absolute alcohol, thereby precipitating the urea salt. The urea salt is filtered off and dried in a vacuum to give the solid compound.

EXAMPLE 3.—*3,5-bis-(3'-stibonyl phenyl thiocarbamido-1-) benzoic acid*

This compound and also its urea salt are made by exactly the same method and using the same quantities as described in Example 2 except that meta-amino phenyl stibonic acid is used instead of para amino phenyl stibonic acid. The free acid may be represented by the formula:

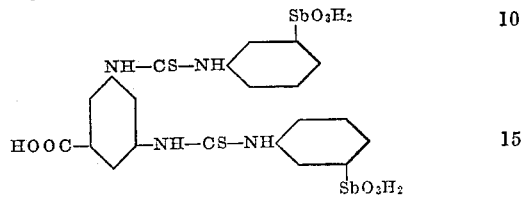

EXAMPLE 4.—*3-carboxy-s-diphenyl thiocarbamido-4'-stibonic acid*

A predetermined quantity of stibanilic acid (para amino phenyl stibonic acid) is suspended in water and brought into solution by adding a minimum amount of sodium hydroxide solution. As in Example 3, the chemically equivalent amount of 3-thiocarbimido benzoic acid for reaction with the stibanilic acid used is then suspended in water and dissolved by adding the minimum amount of sodium hydroxide solution. The 3-thiocarbimido benzoic acid used here is obtained as mentioned under Example 1. The two solutions are then mixed and heated for 15 minutes at 80° C., cooled and acidified with dilute HCl until strongly acid to Congo red paper. The precipitate of 3-carboxy-s-diphenyl thiocarbamido-4'-stibonic acid is then filtered off and washed well with water and hot alcohol and dried to give the solid acid, which gives an antimony analysis agreeing well with the theoretical amount of antimony calculated for $C_{14}H_{13}O_5N_2SSb$. The main reaction of this example may be essentially illustrated by the following equation:

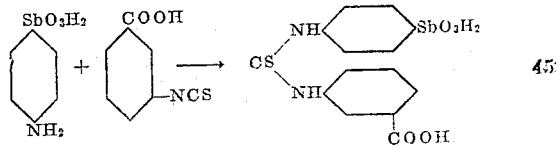

The sodium salt of the acid of this example is obtained by suspending a quantity of the acid in water and bringing it into solution with the minimum amount of sodium hydroxide solution and evaporating the clear neutral solution to dryness in a vacuum. The product is a pale brown amorphous powder. This sodium salt of 3-carboxy-s-diphenyl thiocarbamido-4'-stibonic acid dissolves in water to a clear solution which may be of a more or less brown color. The solution of the sodium salt is practically neutral when tested immediately after its preparation and has a pH of about 6.8–7.2. These solutions do not contain any inorganic antimony as determined by the ammonium sulfide test. They can be tolerated in doses of 2½–5 mg. per 20 gram mouse given subcutaneously. They have also been injected clinically in both male and female patients intravenously with no deleterious reactions in maximum doses up to 0.2 gram or more and have been successfully used against Kala azar. Doses of about 0.1 gram of the sodium salt in 5 cc. of cold water once or twice a week injected into medium sized adults have proved to be satisfactory clinically. The solutions may be given intramuscularly as well as intravenously and their use is not limited to combating Kala azar, but they may also be used against other infections.

EXAMPLE 5.—*Diphenyl thiourea-4:4'-distibonic acid*

A predetermined quantity of 4-thiocarbimido stibonic acid is reacted with the chemically equivalent quantity of para-amino-phenyl-stibonic acid while following the general procedure given in Examples 2 and 4 of reacting the aminophenyl stibonic acid with the thiocarbimido compound. After heating the slightly alkaline solutions of these two reactants for about one-quarter hour at not more than 80° C., the mixture is cooled and acidified to precipitate out insoluble diphenyl thiourea-4:4'-distibonic acid which is filtered off, washed and dried to give the solid acid.

Salts of this compound are made by reacting with the calculated quantity of alkaline or basic solution and bringing the solution down to dryness in a vacuum.

The free acid of this example may be represented by the formula:

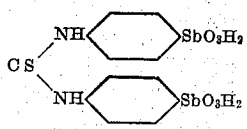

EXAMPLE 6.—*4-carboxy-(s-diphenyl-thiocarbamido)-4'-stibonic acid*

4 grams of para-carboxy-phenyl-thiocarbimide is suspended in 50 cc. of water and 50% sodium hydroxide solution added slowly while stirring until all of the thiocarbimide dissolves. The clear solution is only faintly alkaline to litmus. The stirring is continued vigorously and 5 grams of sodium stibanilate added. The mixture is rapidly heated up to about 80° C. and kept at that temperature for about 10 minutes. It is then cooled, filtered, and the filtrate poured into an excess of alcohol to produce a bulky white precipitate of the mono-sodium salt of 4-carboxy-(s-diphenyl-thiocarbamido)-4'-stibonic acid. This precipitate is filtered off and dried in a vacuum. Analysis of the dry product for antimony gives the theoretical amount required for this compound. The free acid can be prepared by exactly neutralizing the sodium salt and separating out the solid acid compound.

The free acid of this example may be represented as follows:

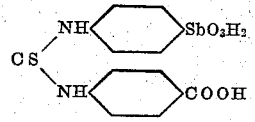

EXAMPLE 7.—*4-hydroxy-(s-diphenyl-thiocarbamido)-4'-stibonic acid*

This compound is prepared in the form of its sodium salt by the method of Example 6 using, however, 4-hydroxy-phenyl-thiocarbimide instead of 4-carboxy-phenyl-thiocarbimide. The sodium salt of the 4-hydroxy-(s-diphenyl-thiocarbamido)-4'-stibonic acid is likewise converted to the free acid by exact neutralization as in Exampe 6 above.

The mono-sodium salt of this example may be represented by the formula:

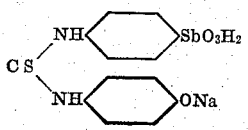

EXAMPLE 8.—*Diphenyl-thiocarbamido-4-stibonic acid-4'-sulfonic acid*

The mono-sodium salt of this compound is prepared by the general procedure given in Examples 6 and 7 by reacting equivalent quantities of solutions of para-amino-phenyl-stibonic acid and 4-thiocarbimido-sulfonic acid. After obtaining the mono-sodium salt, the latter is converted by mineral acid to the free acid which is filtered off, washed and dried.

The mono-sodium salt of this example may be represented by the following formula:

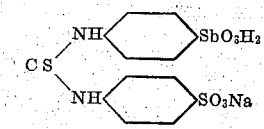

EXAMPLE 9.—*Diphenyl-thiocarbamido-4-stibonic acid-3'-sulfonic acid*

The free acid and the mono-sodium salt of this compound are made in analogous manner to that of Example 8 above which gives their isomeric compounds.

EXAMPLE 10.—*Diphenyl-thiocarbamido-4-stibonic acid-4'-arsonic acid*

As in Examples 8 and 9 above, the mono-sodium salt of this compound is made by reacting neutralized solutions of para-amino-phenyl-stibonic acid and 4-thiocarbamido arsonic acid with each other in equivalent amounts and separating the salt in the usual manner. The free acid is also obtained by neutralization and filtration of the solid acid from its neutralization mixture.

The free acid of this example may be represented by the formula:

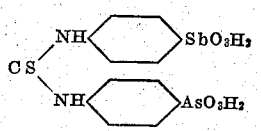

The new compounds of the invention have generally the property of remarkably low toxicity and it is noteworthy that they have a toxicity much below that of the corresponding stibonic acid compounds not containing any thiocarbimido or thiocarbamido groups attached to the aryl nucleus. Solutions of the new compounds can easily be made in sterile form by the usual methods and as such they are generally tolerated in adults in doses up to about 0.2 gram given intravenously, and many of them are also satisfactory for intramuscular injection. They may be used against Kala azar and other parasitic infections. Their solutions can generally be prepared so as to be practically neutral and having substantially normal blood pH. They represent a new type of organic antimony compound and for this reason may also be used as intermediates in the preparation of other new and useful types of compounds.

What we claim as our invention is:

1. 3-carboxy- (s-diphenyl-thiocarbamido) - 4'-stibonic acid.

2. A substantially neutral solution of a salt of 3-carboxy-s-diphenyl-thiocarbamido- 4'- stibonic acid.

3. A substantially neutral solution of the mono-sodium salt of 3-carboxy-(s-diphenyl-thiocarbamido)-4'-stibonic acid.

4. A process for the preparation of a stibonyl diaryl thiocarbamido compound of formula

where R is aryl substituted in the nucleus by a stibonic acid group and R' is aryl substituted in the nucleus by a salt-forming group which comprises reacting in aqueous solution an amino substituted aryl stibonic acid with an aryl thiocarbimide compound substituted in the nucleus by a salt-forming group.

5. A process for the preparation of 3-carboxy-s-diphenyl-thiocarbamido-4'-stibonic acid which comprises reacting in aqueous solution para-amino-phenyl stibonic acid with 3-thiocarbimido benzoic acid.

6. The compounds represented by the following formula,

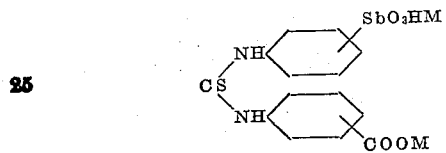

where M is a member of the group consisting of H and a salt-forming basic radical.

7. The compounds represented by the following formula,

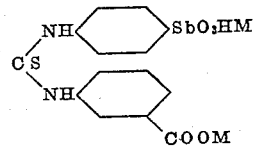

where M is a member of the group consisting of H and a salt-forming basic radical.

8. Compounds represented by the formula,

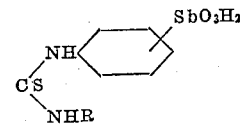

where R is an aryl radical having attached thereto a member of the class consisting of an acid radical and its corresponding salts.

9. Compounds represented by the formula,

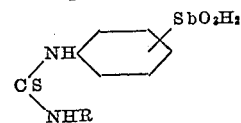

where R is an aryl radical having attached thereto a water-solubilizing salt group.

GEORGE MALCOLM DYSON.
ARNOLD RENSHAW.